(12) United States Patent  
Richburg

(10) Patent No.: US 8,342,590 B1  
(45) Date of Patent: Jan. 1, 2013

(54) TRUCK BED HAVING SLIDABLE TAILGATE

(76) Inventor: William Richburg, Orangeburg, SC (US)

( * ) Notice: Subject to any disclaimer, the term of this patent is extended or adjusted under 35 U.S.C. 154(b) by 180 days.

(21) Appl. No.: 12/902,074

(22) Filed: Oct. 11, 2010

(51) Int. Cl.  
*B60P 1/273* (2006.01)

(52) U.S. Cl. .......................................... 296/50; 296/57.1

(58) Field of Classification Search ............... 296/50, 296/51, 56, 57.1, 58, 61, 37.6, 37.14  
See application file for complete search history.

(56) References Cited

U.S. PATENT DOCUMENTS

| | | | |
|---|---|---|---|
| 4,580,828 A * | 4/1986 | Jones | 296/57.1 |
| 4,601,632 A * | 7/1986 | Agee | 296/61 |
| 5,352,008 A * | 10/1994 | Denvir | 296/50 |
| 6,302,465 B1 * | 10/2001 | Faber et al. | 296/39.1 |
| 6,464,278 B2 * | 10/2002 | Bailey | 296/57.1 |

* cited by examiner

*Primary Examiner* — Lori Lyjak  
(74) *Attorney, Agent, or Firm* — Gulf Coast Intellectual Property Group

(57) ABSTRACT

A pickup truck bed having a tailgate operable to slidably stow underneath the floor of the pickup truck bed. The pickup truck bed further includes a first channel and a second channel integrally formed into the bed to facilitate the positioning of the tailgate such that the tailgate can be stowed underneath the floor of the bed. The tailgate further includes a plurality of wheels operable to engage the first channel and the second channel so as to slidably move the tailgate such that the tailgate is substantially underneath the floor of the pickup truck bed. The tailgate further includes a first attachment pin and a second attachment pin that are operable to pivotally transition the tailgate from a closed position to an open position. The first attachment pin and second attachment pin are further configured to be retractable so as to facilitate the tailgate being slidably transitioned such that the tailgate is underneath the floor of the pickup truck bed.

14 Claims, 2 Drawing Sheets

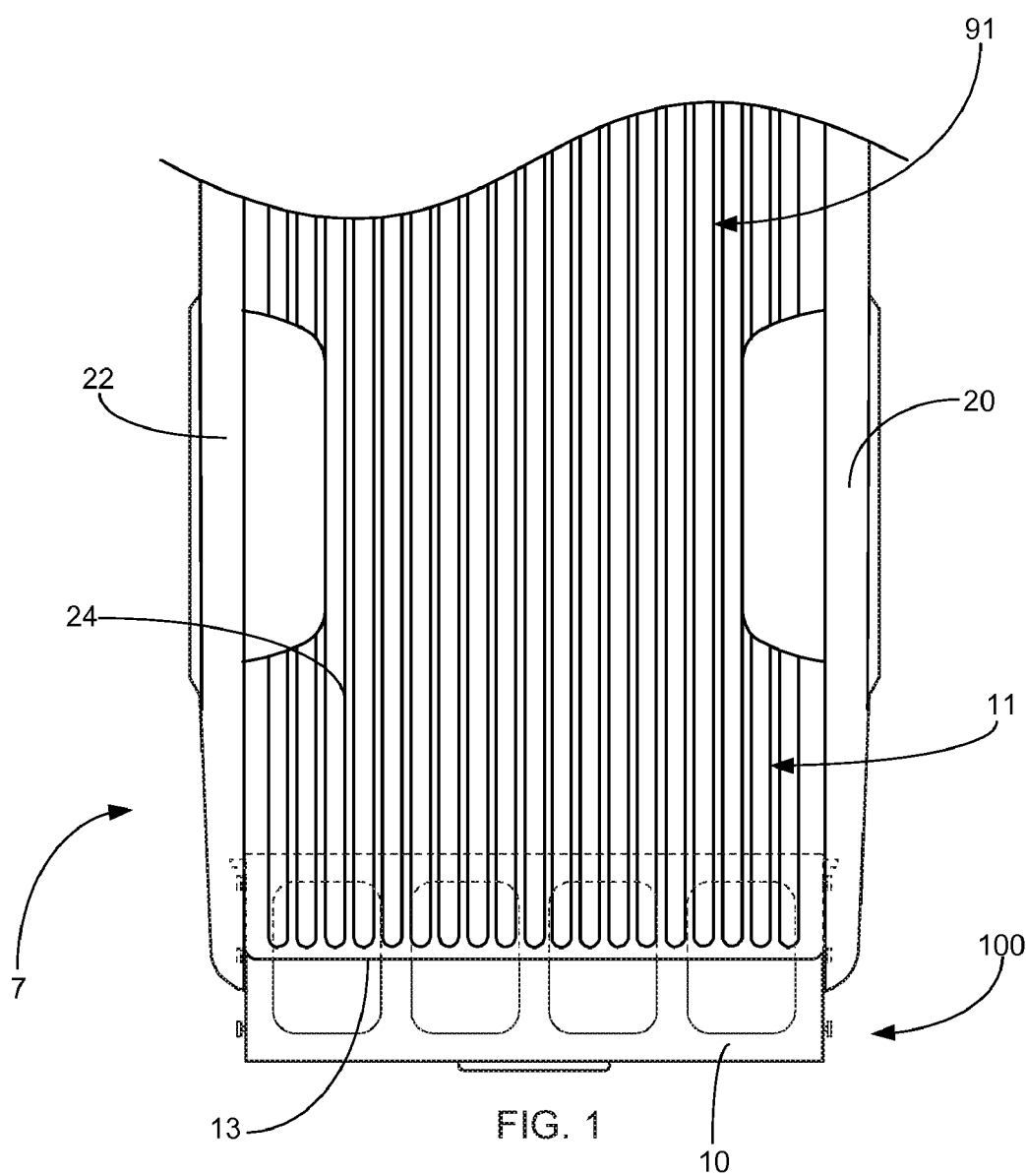
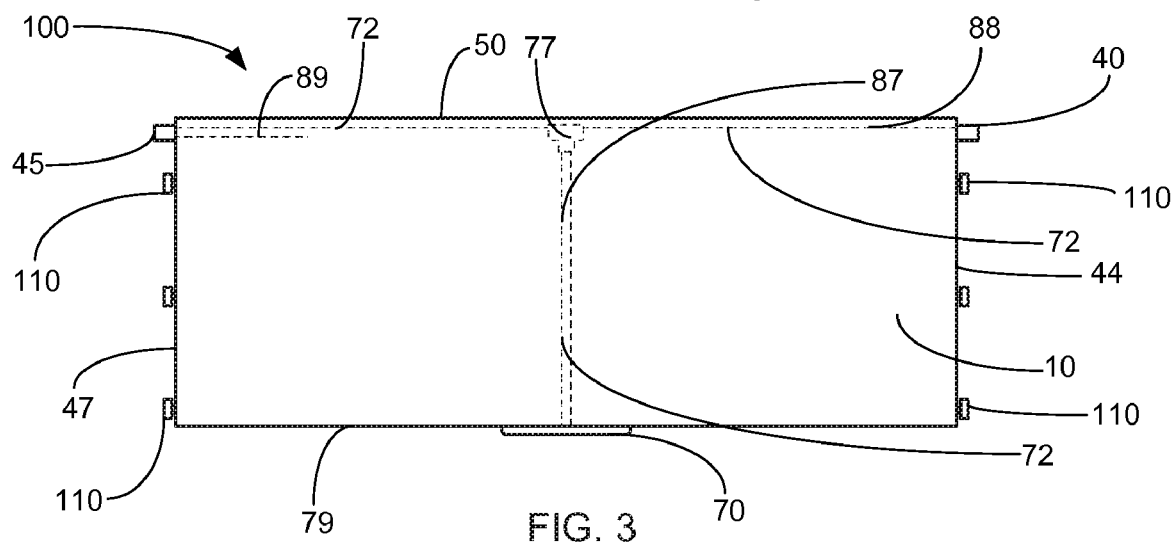

TRUCK BED HAVING SLIDABLE TAILGATE

FIELD OF THE INVENTION

The present invention relates to a pickup truck bed tailgate, more specifically a pickup truck bed tailgate that utilizes a track and wheel mounting method so as to enable the tailgate to be stored substantially underneath the floor of the pickup truck bed.

BACKGROUND

Millions of individuals utilize pickup trucks for work or recreational purposes. Over the last few decades in the United States, pickup trucks models have been purchased by consumers at a volume that is larger than most any other type of vehicle. The pickup trucks utility drives consumer sentiment and increased amenities have assisted in achieving such a large sales volume.

Many individuals will purchase trucks for either their payload or towing capacity. These type of vehicles are designed to carry heavy loads as well as tow large trailers such as but not limited to gooseneck or fifth wheel trailers. These type of trailer configurations routinely have the ball for the hitch mounted within the bed directly of the axle of the trailer. It is common for individuals that are in the process of coupling the gooseneck trailer to a pick up truck to place the tailgate of the pickup truck bed in a down position to allow clearance for a portion of the trailer while the pickup truck is engaged with the trailer. This position can cause damage to the tailgate and its mechanical fasteners during transit as the tailgate will be agitated in a general upwards-downwards direction as the pickup truck traverses across a variety of surfaces. Additionally, with some types of trailers the tailgate of the pickup truck can be constricted in its downward movement to the open position by a portion of the trailer.

A portion of drivers of pickup trucks will routinely place the tailgate of the pickup truck bed in the open position to increase their potential fuel efficiency. Pickup trucks often achieve lower fuel efficiency with the tailgate in the up position as the aerodynamic properties are more favorable when the tailgate of the pickup truck is in the down position. This position however can potentially cause damage to the tailgate. Additionally, with the tailgate in the down position, the tailgate has a higher probability of being hit by a vehicle coming to a stop behind the pickup truck as it is extending past the bumper of the pickup truck.

Accordingly, there is a need for a pickup truck that has a bed that allows the tailgate to be placed in the open position wherein the tailgate transitions to be mounted underneath the floor of the pickup truck bed so as to substantially reduce any interference that may be caused by a tailgate in the down position. Additionally, the tailgate should be mounted underneath the floor of the pickup truck bed so as to substantially reduce any opportunity for damage to occur to the tailgate.

SUMMARY OF THE INVENTION

It is the object of the present invention to provide a pickup truck having a bed with a tailgate wherein the tailgate is operable to be mounted underneath the floor of the bed of the pickup truck.

Another object of the present invention is to provide a pickup truck bed that has a channel on each side of the pickup truck bed that allows the tailgate to be slidably mounted underneath the floor of the pickup truck bed.

A further object of the present invention is to provide a pickup truck bed tailgate that includes a retractable hinge pin that allows the tailgate to be opened in a conventional manner and subsequently be slid under the floor of the pickup truck bed.

Still another object of the present invention is to provide a pickup truck bed tailgate that includes a plurality of wheels configured to engage the channel so as to facilitate the slidable mounting of the tailgate underneath the floor of the pickup truck bed.

An additional object of the present invention is to provide a pickup truck bed tailgate that is substantially mounted underneath the floor of the pickup truck bed so as to inhibit any damage to the tailgate upon the tailgate being in the open position.

Still another object of the present invention is to provide a pickup truck bed tailgate that is operated either manually or with an electric motor.

Yet a further object of the present invention is to provide a pickup truck bed tailgate that is mounted substantially underneath the floor of the bed of the pickup truck wherein the tailgate is locked into position upon being mounted underneath the floor of the bed.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a top view a pickup truck bed illustrating the preferred embodiment of the tailgate of the present invention partially deployed; FIG. 3 is a top view of the present invention.

DETAILED DESCRIPTION

Figure 2:
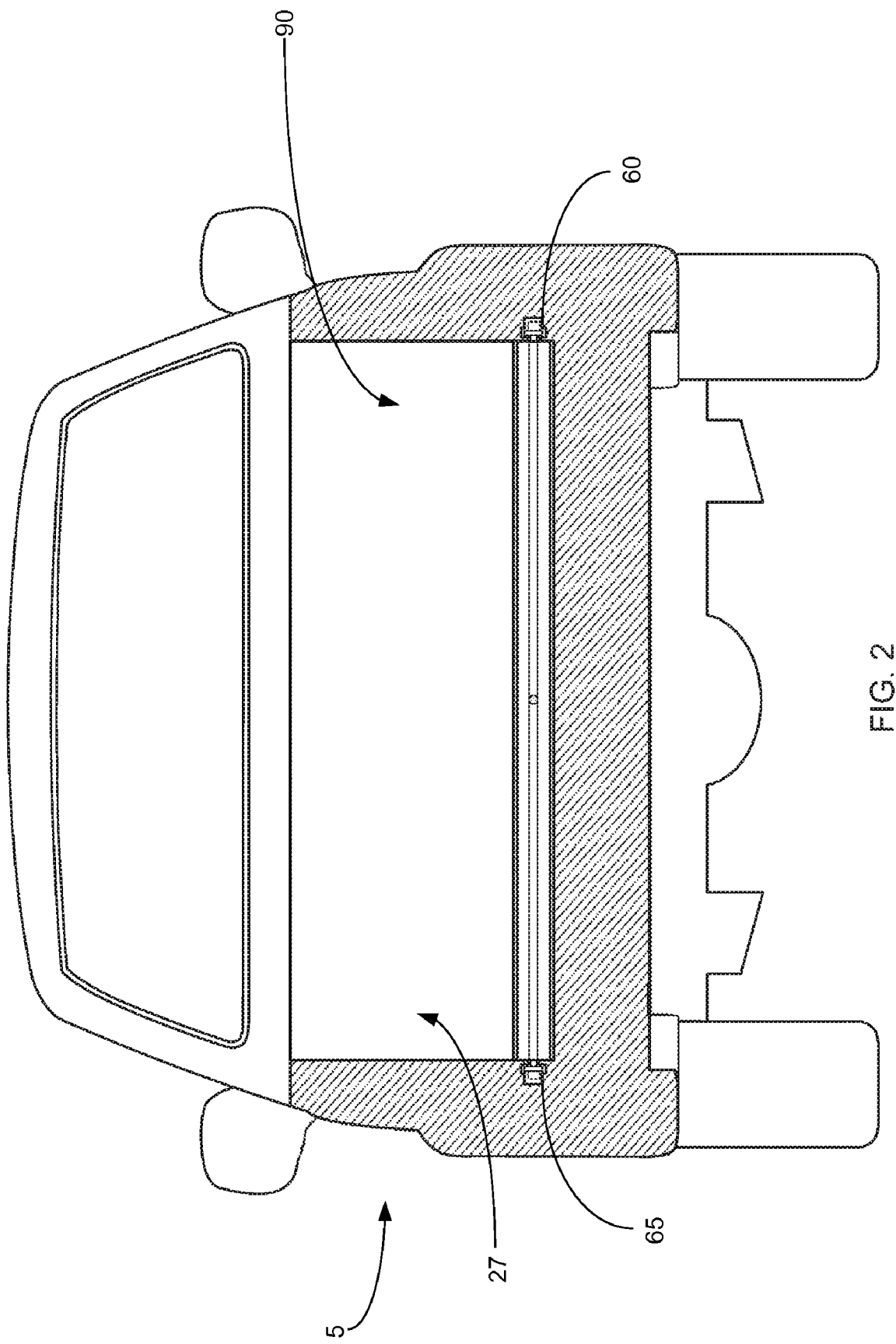
FIG. 2 is an end view of a pickup truck bed having the tailgate of the present invention.

Referring now to the drawings submitted herewith, wherein various elements depicted therein are not necessarily drawn to scale and wherein through the views and figures like elements are referenced with identical reference numerals, there is illustrated a tailgate 100 constructed according to the principles of the present invention.

Referring in particular to FIGS. 1 and 3 there is illustrated therein a tailgate 100 having a body 10 that is manufactured from a suitable durable material such as but not limited to metal. The body 10 is generally rectangular in shape and is of suitable size to close the end opening 90 of the truck bed 91. Those skilled in the art will recognize that the body 10 could be formed in numerous different shapes in order to operably engage a pickup truck bed 11 having an end opening 90 of a particular shape. As is known in the art, pickup trucks 5 have a rearward portion 7 that is designed to receive objects therein commonly known as a bed 11. The bed 11 consists of a first side 20, second side 22, floor 24 and end wall (not illustrated herein). The first side 20, second side 22 and floor 24 are formed utilizing conventional construction techniques to create an interior volume 27 configured to receive materials therein. The bed 11 has an end opening 90 that is intermediate the first side 20 and the second side 22. The tailgate 100 operably couples to the bed 11 and functions to allow access to the end opening 90 permitting a user to place objects into the bed 11.

The tailgate 100 includes a first attachment pin 40 and second attachment pin 45. The first attachment pin 40 and second attachment pin 45 are secured utilizing conventional techniques to the body 10 proximate the bottom edge 50. The first attachment pin 40 and second attachment pin 45 function to engage a first bore and second bore (not illustrated herein) in the lateral channels 60, 65. The first bore and second bore are integrally formed with the pickup truck bed 11 and are underneath the floor 24 and proximate the forward edge 13 of the floor 24. The first attachment pin 40 and second attachment pin 45 function to facilitate the pivotal movement of the tailgate 100 with respect to the end opening 90 such that that tailgate can pivot to either substantially place the end opening 90 in an open or closed position. The first attachment pin 40 and second attachment pin 45 are further operably coupled to the handle 70 utilizing lever rods 72. The lever rods 72 function to allow a user to move the first attachment pin 40 and second attachment pin 45 to a refracted position such that the first attachment pin 40 and second attachment pin 45 are no longer journaled into the first and second bore located within the lateral channels 60,65.

The lever rods 72 are operably coupled to the handle 70 utilizing conventional techniques and are manufactured from a suitable durable material such as but not limited to metal. Those skilled in the art will recognize that the lever rods 72 could be manufactured from cylindrical shaped rod or flat bar and still achieve the desired function as described herein. The handle 70 is pivotally mounted to the tailgate utilizing conventional suitable methods so as to facilitate the directional movement of lever rod 87 when a user pivots the handle 70 generally away from the tailgate 100.

Operable engaged with the lever rods 72 is the union 77. The union 77 functions to transfer the directional movement of the lever rod 87 intermediate the handle 70 and the union 77 and convert the directional movement of the lever rod 87 such that the lateral lever rods 88, 89 move in a lateral direction so as either to deploy or retract the first attachment pin 40 and the second attachment pin 45. Those skilled in the art should recognize that the union 77 could be constructed in numerous different manner to facilitate the transfer of directional movement of the handle 70 such that the lever rods 72 function to either deploy or retract the first attachment pin 40 and second attachment pin 45.

Integrally secured to the first edge 44 and second edge 47 of the body 10 are a plurality of wheels 110. The wheels 110 are manufactured of suitable durable material such as but not limited to metal and are mounted to the body 10 utilizing conventional techniques. The wheels 110 function to engage the lateral channels 65 and permit the tailgate 100 to slidably move underneath the floor 24 of the pickup truck bed 11. While there are six wheels illustrated herein, those skilled in the art will recognize that any number of wheels 110 could be utilized to achieve the desired functionality of slidably moving the tailgate 100 along the lateral channels 60, 65. Subsequent the first attachment pin 40 and second attachment pin 45 being placed in a generally retracted position such that the first attachment pin 40 and second attachment pin 45 are no longer journaled into the first and second bore, the tailgate 100 can traverse along the lateral channels 60,65 so as to be placed in a position wherein the tailgate 100 is substantially underneath the floor 24 of the pickup truck bed 11. Not illustrated herein are a third bore and a fourth bore that are located within the lateral channels 60.65 and function to receive the first attachment pin 40 and second attachment pin 45 respectively. Subsequent the tailgate 100 being slidably traversed along the lateral channels 60, 65 such that the tailgate 100 is substantially underneath the floor 24, the first attachment pin 40 and second attachment pin 45 journal into the third and fourth bore to releasably secured the tailgate 100 in a stowed position.

The lateral channels 60,65 are integrally formed into the pickup truck bed 11 and are underneath the floor 24. The lateral channels 60,65 are generally square u in shape and are of suitable size to accommodate the wheels 110 therein to permit the tailgate 100 to be slidably mounted underneath the floor 24 of the pickup truck bed 11. The lateral channels 60,65 further have a longitudinal length that is at least equivalent to or greater than the length of the first edge 44 and second edge 47. It is contemplated within the scope of the present invention that the lateral channels 60,65 could be either integrally formed with the pickup truck bed 11 or be constructed independently and secured to an existing truck bed to facilitate a retrofit of the tailgate 100 to a pickup truck 5 having a conventional tailgate.

A description of the operation of the tailgate is as follows. In use, a user will engage the handle 70 of the tailgate 100 upon the tailgate 100 being in its open position. Although not illustrated herein, those skilled in the art will recognize that conventional fasteners such as brackets and/or chains could be releasably secured to the tailgate 100 to hold the tailgate 100 in a substantially open position. As the user pivots the handle 70 the lever rod 87 commences directional movement that is applied to the union 77. The union 77 transfers the directional movement of the lever rod 87 to lateral directional movement on lever rods 88 and 89. As lever rods 88, 89 laterally transition towards the union 77 the first attachment pin 40 and second attachment pin 45 retract and are released from the first bore and second bore respectively. The user then applies a force to the top edge 79 of the tailgate 100 in order to slidably move the tailgate 100 along the lateral channels 60,65 wherein the wheels 110 facilitate the movement of the tailgate 100. Once the tailgate 100 has been positioned such that the tailgate 100 is substantially underneath the floor 24 that user will release the handle 70 such that the first attachment pin 40 and second attachment pin 45 will deploy and be journaled into a third and fourth bore respectively so as to releasably secure the tailgate 100 in a stowed position.

While not illustrated herein, the tailgate 100 upon being placed in a position such that the tailgate 100 is substantially open it is contemplated within the scope of the present invention that the tailgate 100 is substantially horizontal and in axial alignment with the floor 24. This position facilitates easier loading of objects into the pickup truck bed 11. The aforementioned first bore and second bore that engage the first attachment pin 40 and second attachment pin respectively, are configured to facilitate the positioning of the tailgate 100 such that the tailgate 100 is in substantial horizontal axial alignment with the floor 24. Additionally, the handle 70 further functions to transition the tailgate 100 within the first bore and second bore such that the handle 70 includes a position that facilitates the downward movement of the tailgate 100 such that the tailgate 100 can be slidably stowed underneath the floor 24 of the pickup truck bed 11. Those skilled in the art will recognize that numerous conventional mechanical fasteners could be utilized to achieve this desired functionality. Furthermore, it is contemplated within the scope of the present invention that the tailgate 100 upon being slidably retrieved from underneath the floor 24 will be raised to a position using convnetional springs or similar devices such that the tailgate 100 is substantially in horizontal axial alignment with the floor 24 until the handle 70 is engaged and the tailgate 100 is pivoted to a closed position.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A pickup truck bed comprising:
   a storage compartment, said storage compartment having a floor, said storage compartment having a first side wall and a second side wall, said storage compartment having a end wall, said end wall being intermediate said first side wall and said second side wall; and
   a tailgate, said tailgate being intermediate said first side wall and said second side wall, said tailgate being distal from said end wall, said tailgate being pivotally mounted to the pickup truck bed proximate said floor, said tailgate further being slidably mounted such that said tailgate is stowable underneath said floor of the pickup truck bed;
   a first channel and a second channel, said first channel and said second channel integrally formed with the pickup truck bed, said first channel and said second channel configured to slidably receive said tailgate; and
   at least one wheel, said wheel being mounted to said tailgate, said wheel configured to engage at least one of said first channel and said second channel, said wheel operable to slidably move said tailgate along said first channel and said second channel.

2. The pickup truck bed as recited in claim 1, and further including at least one hinge pin, said hinge pin operable to move said tailgate from a first position to a second position, said at least one hinge pin being retractable, said hinge pin retractably configured to transition said tailgate to a third position underneath said floor of the pickup truck bed.

3. The pickup truck bed as recited in claim 2, and further including a handle, said handle operably connected to said at least one attachment pin, said handle configured to provide an interface for a user to transition said tailgate between said first, second and third positions.

4. The pickup truck bed as recited in claim 3, and further including at least one aperture, said aperture integrally formed with the pickup truck bed, said aperture being located within said first channel, said aperture for receiving said at least one hinge pin upon said hinge pin being in a deployed position.

5. The pickup truck bed as recited in claim 4, wherein said tailgate is configured to be releasably secured underneath said floor.

6. A pickup truck having a bed comprising:
   a storage compartment, said storage compartment having an interior volume configured to receive objects therein, said storage compartment having a floor, said storage compartment having a first side wall and a second side wall, said first side wall and said second side wall having a first end and a second end, said storage compartment having a end wall, said end wall being intermediate said first side wall and said second side wall proximate said first end of said first sidewall and said second sidewall;
   a tailgate, said tailgate being intermediate said first side wall and said second side wall proximate said second end of said first sidewall and said second sidewall, said tailgate having a first, second and third position, said tailgate having an upper edge and a lower edge, said tailgate being pivotally mounted to said first sidewall and said second sidewall proximate said second end, said tailgate in said second position being in substantial horizontal axial alignment with said floor, wherein in said first position said tailgate is in a generally upright position being intermediate said first sidewall and said second sidewall proximate said second end, wherein in said second position said tailgate is in a substantially horizontal position facilitating access to said storage compartment, said tailgate configured to pivotally move from said first position to said second position;
   a first track and a second track, said first track and said second track integrally formed with the pickup truck underneath said floor, said first track and said second track operable to assist said tailgate transition from said second position to said third position;
   a plurality of wheels, said wheels integrally mounted to said tailgate, said wheels operable to engage said first track and said second track, said wheels operable to slidably transition said tailgate from said second position to said third position; and
   wherein in said third position said tailgate is positioned such that said tailgate is underneath said floor of said storage compartment.

7. The pickup truck having a bed as recited in claim 6, and further including a first attachment pin and a second attachment pin, said first attachment pin and said second attachment pin mounted on opposing sides of said tailgate proximate said lower edge, said first attachment pin and said second attachment pin being retractably mounted to said tailgate.

8. The pickup truck having a bed as recited in claim 7, and further including a handle, said handle operably coupled with said first attachment pin and said second attachment pin, said handle operable to transition said first attachment pin and said second attachment pin between a first and a second position, wherein said first attachment pin and said second attachment pin are substantially deployed in said first position, said first attachment pin and said second attachment pin configured to facilitate the pivotal movement of said tailgate from said first position to said second position.

9. A bed of a pickup truck comprising:
   a storage compartment, said storage compartment having an interior volume configured to receive objects therein, said storage compartment having a floor, said storage compartment having a first side wall and a second side wall, said first side wall and said second side wall having a first end and a second end, said storage compartment having an end wall, said end wall being intermediate said first side wall and said second side wall proximate said first end of said first sidewall and said second sidewall;
   a tailgate, said tailgate being generally rectangular in shape, said tailgate being intermediate said first side wall and said second side wall proximate said second end of said first sidewall and said second sidewall, said tailgate having an upper edge and a lower edge, said tailgate having a first side and a second side, said tailgate being pivotally mounted to said first sidewall and said second sidewall proximate said second end, said tailgate operable to transition between a first, second and third position, said tailgate in said second position being horizontal and in horizontal axial alignment with said floor;

a first attachment pin, said first attachment pin being mounted to said first side of said tailgate proximate said lower edge, said first attachment pin configured to be retractable into said tailgate;

a second attachment pin, said second attachment pin being mounted to said second side of said tailgate proximate said lower edge, said second attachment pin configured to be retractable into said tailgate;

a plurality of wheels, said wheels being mounted to said first side and said second side of said tailgate; and wherein in said third position said tailgate is stowed underneath said floor.

10. The bed of a pickup truck as recited in claim 9, and further including a first channel and a second channel, said first channel and said second channel being integrally formed with the bed underneath said floor, said first channel and said second channel extending generally parallel with said first sidewall and said second sidewall, said first channel and said second channel being square u-shaped, said first channel and said second channel having a first end and a second end.

11. The bed of a pickup truck as recited in claim 10, and further including a first, second, third and fourth bore, said first and second bore being journaled into the bed and being disposed within said first and second channel proximate said first end, said third and fourth bore being journaled into the bed being disposed within said first and second channel proximate said second end, said third and fourth bore configured to receive said first attachment pin and said second attachment pin.

12. The bed of a pickup truck as recited in claim 11, and further including a handle, said handle mounted to, said tailgate proximate said upper edge, said handle operably coupled to said first attachment pin and said second attachment pin, said handle configured to retract and deploy said first attachment pin and said second attachment pin.

13. The bed of a pickup truck as recited in claim 12, wherein said wheels are operable to engage said first channel and said second channel upon said tailgate being placed in said second position and wherein said wheels slidably transition said tailgate from said second position to said third position.

14. The bed of a pickup truck as recited in claim 13, wherein subsequent said tailgate being place in said third position, said first attachment pin and said second attachment pin are deployed and engaged with said third bore and said fourth bore respectively so as to releasably secure said tailgate in said third position.

\* \* \* \* \*